United States Patent

[11] 3,587,391

| [72] | Inventors | Robert D. Pitts<br>Yellville, Ark.;<br>Lewis L. McAllister, Marion, Iowa |
|---|---|---|
| [21] | Appl. No. | 860,881 |
| [22] | Filed | Sept. 25, 1969 |
| [45] | Patented | June 28, 1971 |
| [73] | Assignee | Collins Radio Company, Dallas, Tex. |

[54] WORK SUPPORT MECHANISM
14 Claims, 9 Drawing Figs.

[52] U.S. Cl....................................................... 90/11R,
77/55G, 269/267
[51] Int. Cl........................................................ B23c 9/00,
B25b 11/00

[50] Field of Search........................................... 90/11 (R),
15, (Dig.)16, 11.1; 77/55 (G); 269/267, 154;
51/(Inquired)

[56] References Cited
UNITED STATES PATENTS
| 3,065,654 | 11/1962 | Critelli et al................. | 77/55GX |
| 2,379,182 | 6/1945 | Porter et al................... | 90/59.6 |

*Primary Examiner*—Gil Weidenfeld
*Attorneys*—Henry K. Woodward and Robert J. Crawford ABSTRACT: A work support mechanism for use with a shaping machine including a plurality of hold down assemblies and rollers for supporting a work piece in the immediate vicinity of a machining operation.

INVENTORS.
ROBERT D. PITTS
LEWIS L. McALLISTER

BY H. K. Woodward
ATTORNEY

INVENTORS.
ROBERT D. PITTS
LEWIS L. McALLISTER

BY  H. K. Woodward

ATTORNEY

INVENTORS.
ROBERT D. PITTS
LEWIS L. McALLISTER

BY *H. F. Woodward*

ATTORNEY

WORK SUPPORT MECHANISM

This invention relates generally to shaping machines, and in particular to a work support mechanism especially useful with high-speed milling and drilling machines and the like.

A workpiece undergoing a machining operation is normally mounted on the machine table by means of a special tooling plate or work adapter in combination with locating pins. Such means insures the proper positioning of the workpiece especially with tape controlled machines, during the machining operation. However, support means must be provided in the immediate vicinity of the machining operation to prevent damage to the workpiece. For example, as milling or routing of a workpiece progresses, the workpiece is cut away and generally becomes weakened and possibly unable to hold its own shape. Inflatable pressure feet have inherent limitations as support means where there is any lateral movement between the workpiece and the tools. Vacuum chucks may be employed to hold an individual workpiece, but is incapable of supporting stacked workpieces such as printed circuit boards.

SUMMARY OF THE INVENTION

Accordingly, an object of this invention is a work support means capable of holding one of more workpieces singly or stacked during a machine operation.

Another object of the invention is work support means which allows considerable relative movement between a workpiece and the machine tool.

Still another object of the invention is work support means which firmly supports a workpiece in the immediate vicinity of the machining operation.

Yet another object of the invention is the general improvement of work support means in shaping machines.

Briefly, the work support mechanism in accordance with the present invention is mounted to the tool support and guide assembly of a shaping machine and encircles the machine tool. A plurality of hold down assemblies, including spherical rollers, are independently biased to engage a workpiece in the machine table beneath the work support mechanism and machine tool. Preferably, air is supplied to each spherical bearing to reduce friction and facilitate lateral movement of the workpiece with respect to said work support mechanism and the machine tool. The spherical rollers and hold down assemblies are uniquely supported to facilitate movement of a workpiece without damage to said workpiece or the machine equipment even when said spherical rollers drop into a groove or off an edge of the workpiece.

The invention and objects and features thereof will be more fully understood from the following detailed description and appended claims when taken with the drawings, in which:

Like elements in all views have the same reference numerals.

DETAILED DESCRIPTION OF ONE EMBODIMENT

Figure 1:
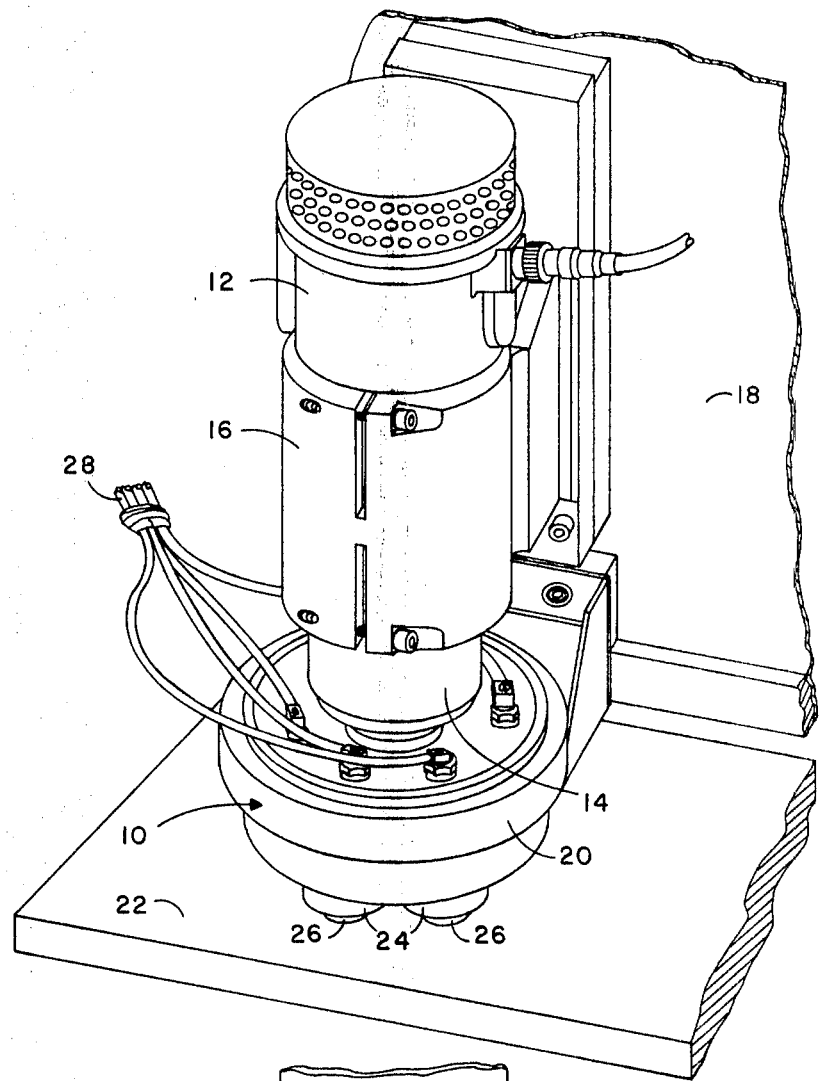
FIG. 1 is a perspective view of a portion of a shaping machine including a work support means in accordance with the present invention.

Referring now to the drawings, FIG. 1 is a perspective view of a portion of a shaping machine, including a work support mechanism 10, in accordance with the present invention. A high-speed motor 12 and spindle 14 of the machine are supported by mount 16 which forms a portion of a precision slide movably mounted on machine column 18. Work support mechanism 10 includes a support housing 20 which is immovably mounted to machine column 18. The work support mechanism 10 is designed to encircle a tool connected by collet means to the spindle 14, as will be described below with reference to FIG. 3. Thus, the spindle and tool are vertically movable with respect to stationary work support mechanism 10 which supports a workpiece (not shown) mounted on horizontally movable table 22 of the shaping machine. A plurality of holddown assemblies 24 including spherical rollers 26, engage a workpiece in the immediate vicinity of a machining operation on the workpiece. A plurality of hoses 28 connect air to each of the holddown assemblies to reduce the friction of the spherical rollers 26.

Figure 2:
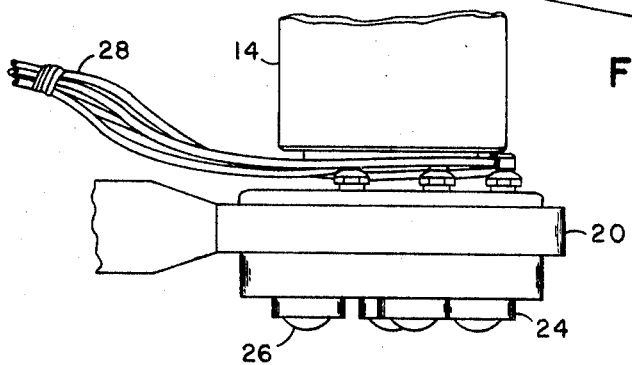
FIG. 2 is a side view of the work support means of FIG. 1.

FIG. 2 is a side view of the work support mechanism of FIG. 1 and further illustrates the support housing 20 and holddown assemblies 24.

Figure 3:
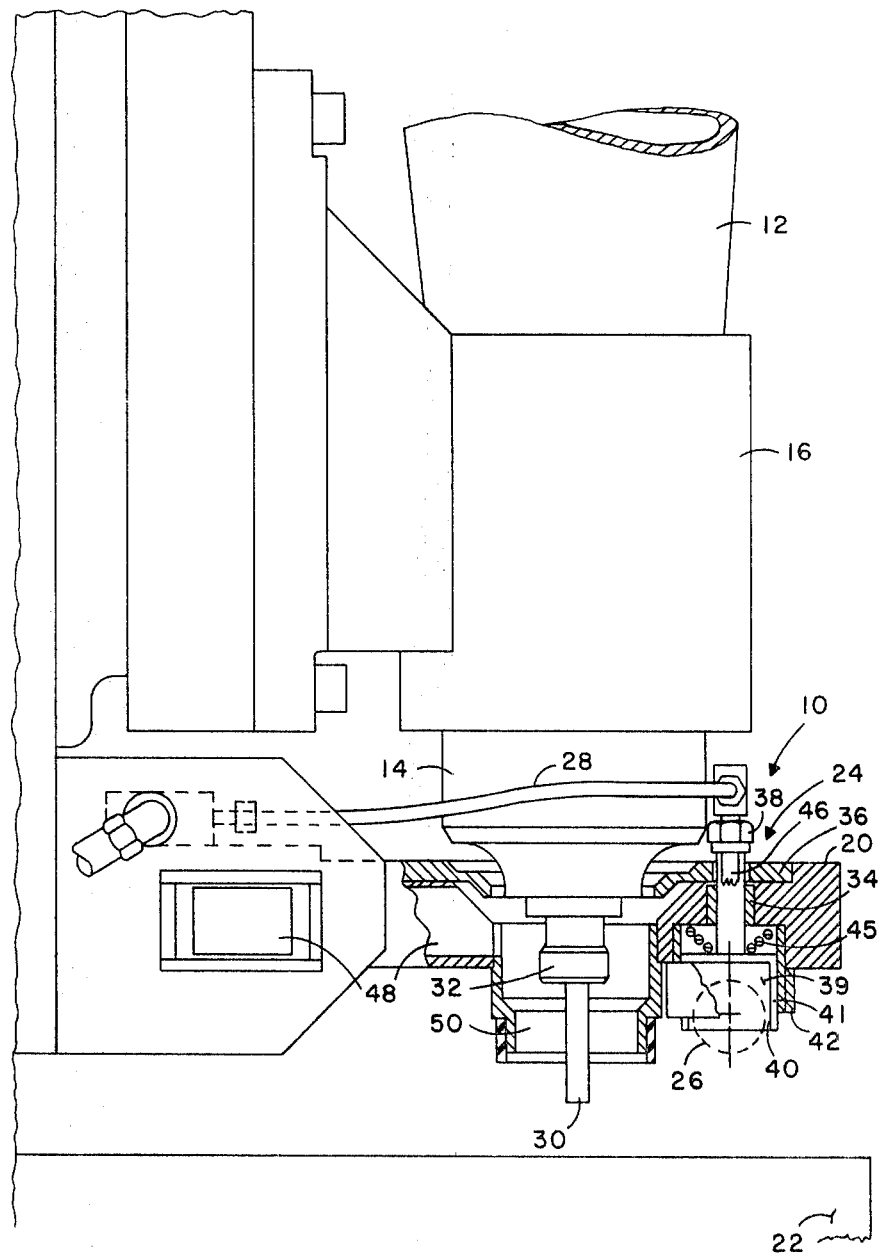
FIG. 3 is a side view of the shaping machine portion of FIG. 1 including a section view of a portion of said work support mechanism.

Referring now to FIG. 3, shown is a side view of the shaping machine portion of FIG. 1, including a section view of a portion of the work support mechanism. It is seen that spindle 14 and tool bit 30, which is mounted by collet 32 to spindle 14, may be moved vertically through work support mechanism 10 to engage a workpiece mounted on table 22. Holddown assembly 24 is accommodated in the support housing 20 with stem 34 passing through the support housing 20 and a height adjustment plate 36. Height adjustment place 36 is accommodated in a recessed portion in the top surface of housing 20, and nut 38 threadably attached to the end of stem 34 engages plate 36 to thereby limit the vertical excursion of work holddown assembly 24 when the spherical roller 26 thereof rolls off the edge of a workpiece, for example. Roller 26 is mounted along with a spherical bearing 39 and lower retainer 40 in sleeve 41, as will be further described below with reference to FIG. 6. Sleeve 41 is vertically movably supported inside of socket 42 of housing 20. Conical spring 45 biases the sleeve 41 and roller 26 into engagement with a workpiece on the table, with the vertical travel limited by height plate 36, as above described.

Air hose 28 is connected to stem 34, and bore 46 through stem 34 directs the air to roller 26, as will be described more fully below with respect to FIG. 6. Vacuum duct 48 in housing 20 cooperatively functions with nozzle 50 to carry off chips and waste material during a machining operation.

Figure 4:
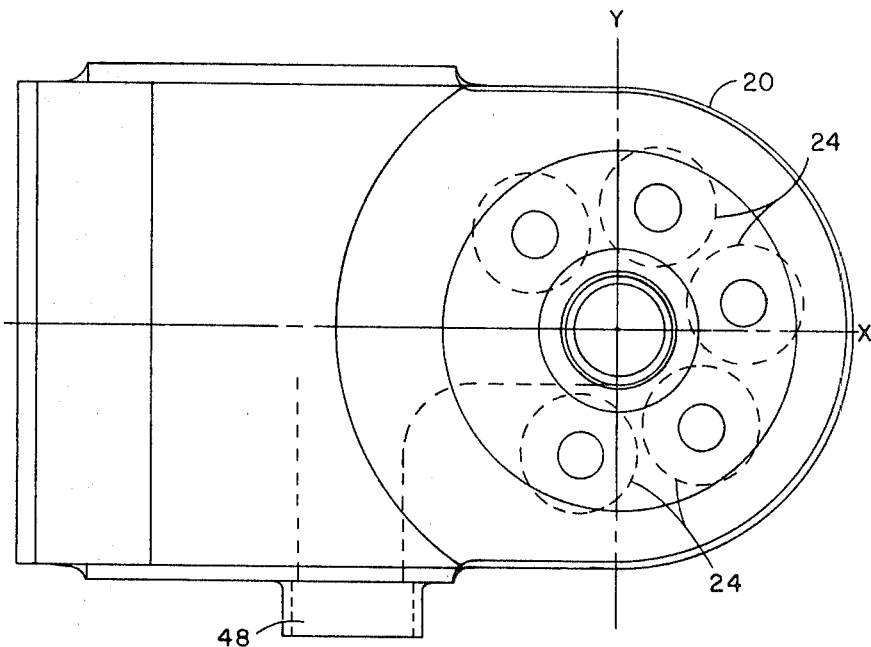
FIG. 4 is a top view of the support housing of the work support mechanism and illustrates the arrangement of the plurality of holddown assemblies mounted therein.

FIG. 4 is a top view of a support housing 20 which is designed to accommodate five holddown assemblies 24 and illustrates the respective positions of the holddown assemblies. It will be noted that each of the five work support assemblies 24 has a unique position with respect to either of the indicated X-axis or Y-axis; that is, no two positions have the same X coordinate or Y coordinate. Thus, when a workpiece moves along either the X-axis or the Y-axis, beneath the work support mechanism, only one roller at a time will drop off an edge of the workpiece or ride back over the edge at any one time. This arrangement of the work support assemblies minimizes the possibility of damage to the workpiece or to the machine equipment.

Figure 5:
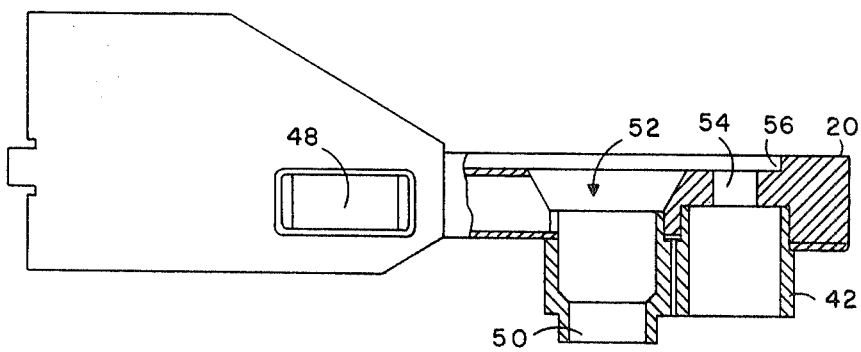
FIG. 5 is a side view partially in section of the support housing in FIG. 4.

Referring now to the side view of support housing 20, partly in section, shown in FIG. 5, the central tapered bore shown generally at 52 accommodates the spindle and tool bit of the shaping machine as the spindle is moved downwardly to engage a workpiece. Nozzle 50 at the bottom of bore 52 cooperates with vacuum duct 48 to remove chips and waste material during a machining operation. Socket 42 accommodates a work support assembly with the stem of the work support assembly extending upward through bore 54. Recessed portion 56 in the upper surface of housing 20 accommodates the height plate which limits the vertical excursion of each holddown assembly.

Figure 6:
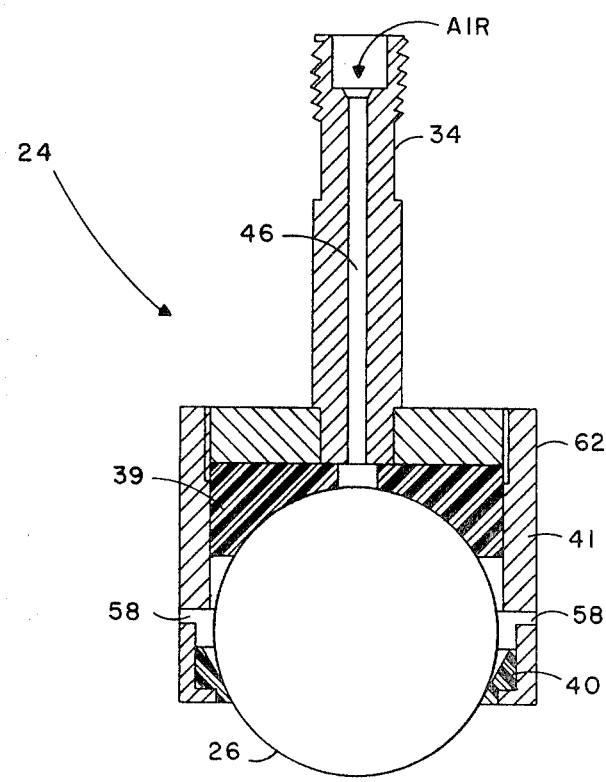
FIG. 6 is a section view of a holddown assembly.

With reference to FIG. 6, a work holddown assembly 24 is shown in cross section to illustrate the details thereof. Stem 34 is threaded on the upper end to receive the nut 38 in FIG. 3, and includes a central bore 46 for transferring air to spherical roller 26. The air travels between the roller 26 and spherical bearing 39 to exhausts 58. The provision of air to the spherical roller 26 is not essential to the work holddown assembly, but does reduce friction and facilitates movement of a workpiece beneath the work support mechanism. The lower ball retainer 40 is provided in the cylindrical sleeve 41 to retain spherical roller 26 within the sleeve. In most embodiments, spherical roller 26 is made of steel and bearing 39 and lower retainer 40 are made of Teflon or other low-friction material. However, for some applications a more resilient roller may be desired, in which case a nylon roller or other suitable material may be mounted in a bearing of hardened steel.

Figure 7:
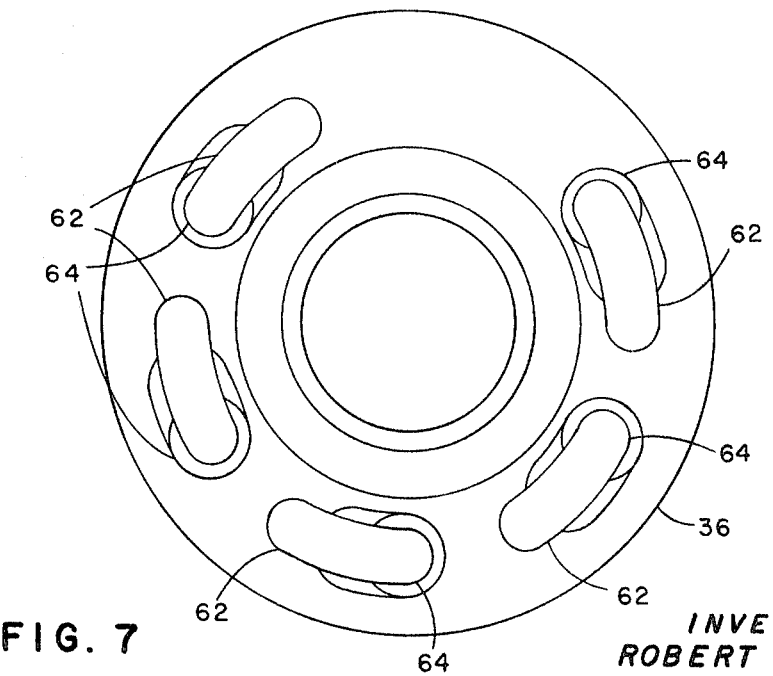
FIG. 7 is a top view of the height adjustment plate which is mounted in the support housing and limits the vertical movement of each holddown assembly.

FIG. 7 is a top view of height adjustment plate 36 which limits the vertical travel of each holddown assembly 24. Five elongated slots 62 are provided in the plate to permit partial rotation of the plate in the recessed mounting in support housing 20. Each of the elongated slots is step milled or counter bored to provide a plurality of steps of increasingly greater depth as indicated at 64. Thus, the height adjustment plate 36 may be rotated to selectively provide a limit or bottom stop for the nut 38 provided on stem 34 of the work holddown assembly 24.

It will be appreciated that as the workpiece is moved about on the machine table under the spindle and work support mechanism, the spherical roller 26 will be biased against the workpiece by the conical compression springs 45. When a spherical roller drops off the edge of a workpiece, as work is being performed close to an edge, the distance the individual roller will be permitted to drop is controlled by the setting of the height adjustment plate 36. By so limiting the distance the ball roller assemblies may drop off the edge of the work to a reasonable distance, preferably in the range of one-sixteenth to one-eighth inch, it is possible and practical for the ball assemblies to ride back up over the edge and onto the workpiece without damage to either the workpiece or the machine equipment. The roller assemblies also may ride up and over hold down or other protuberances on the surface of the workpiece as well as accommodate grooves or slots already routed in the workpiece. It should be further appreciated that when air is supplied to the stem 34 of the roller assembly, the air will be forced downwardly through the axial bore 46 and will flow out between the upper surface of the roller 26 and its mating bearing surface 39 to provide a low-friction air bearing. While this feature improves the operation of the work support mechanism, it is not essential to the operation thereof.

Thus, while the invention has been described with reference to a specific embodiment, the description is illustrative of the invention and is not to be construed as limiting the scope of the invention. Various modifications and changes may occur to those skilled in the art without departing from the spirit and scope of the invention.

We claim:

1. In combination with a shaping machine, a work support mechanism comprising:
   support housing means attached to said shaping machine,
   a plurality of work holddown means each including
      roller means,
      bearing means cooperatively functioning with said roller means,
      sleeve means for accommodating said roller means and said bearing means, and
      stem means connected with and supporting said sleeve means, said support housing means receiving and supporting each of said plurality of work holddown means.

2. A work support mechanism as defined by claim 1 wherein one surface of said support housing means includes a recessed portion, and further includes a height adjustment plate which is accommodated in said recessed portion, said plate including a plurality of slots through which said stem means are received.

3. A work support mechanism as defined by claim 2 wherein each of said slots in said plate includes a plurality of steps of increasingly greater depth to adjust the travel of each of said work holddown means.

4. A work support mechanism as defined by claim 1 wherein each of said stems includes an axially extending hole, and further includes air supply means connected to each of said stems for supplying air through said stems to said roller means.

5. A work support mechanism as defined by claim 1 wherein each of said roller means has a unique position with respect to two axes of movement of the table of said shaping machine.

6. A work support mechanism as defined by claim 1 wherein said support housing means includes a central bore section through which the spindle and tool means of the shaping machine are accommodated.

7. A work support mechanism for holding a workpiece against the table of a shaping machine during a shaping operation comprising a support housing member having a central bore section through which the spindle and tool means of the shaping machine are accommodated, a plurality of sockets spaced around said central bore section, a plurality of holddown members, each holddown member including
   sleeve means which is slidably supported within a socket,
   stem means connected with said sleeve means and extending through said support housing,
   roller means accommodated in said sleeve means, and
   biasing means for urging said sleeve means and roller means into engagement with a workpiece.

8. A work support mechanism as defined by claim 7 wherein one surface of said support housing member includes a recessed portion, and further includes a height adjustment plate which is accommodated in said recessed portion, said plate including a plurality of slots through which said stem means are received.

9. A work support mechanism as defined by claim 7 wherein each of said slots in said plate includes a plurality of steps of increasingly greater depth to adjust the travel of each of said work holddown means.

10. A work support mechanism as defined by claim 7 wherein each of said stems includes an axially extending hole, and further includes air supply means connected to each of said stems for supplying air through said stems to said roller means.

11. A work support mechanism as defined by claim 7 wherein each of said roller means has a unique position with respect to two axes of movement of the table of said shaping machine.

12. For use in combination with a work support mechanism including a support housing member having a plurality of sockets, a holddown assembly received and supported in each of said sockets, said holddown assembly including sleeve means which is slidably supported within said socket, stem means connected with said sleeve means and designed to extend through the support housing, and roller means accommodated in said sleeve means.

13. A holddown assembly as defined by claim 12 and further including means for attaching to the end of said stem means to limit the travel of said sleeve means within a socket.

14. A holddown assembly as defined by claim 12 wherein each of said stems includes an axially extending hole, and further includes air supply means connected to each of said stems for supplying air through said stems to said roller means.